(12) United States Patent
Lehane et al.

(10) Patent No.: US 10,320,955 B1
(45) Date of Patent: Jun. 11, 2019

(54) METHOD FOR DECODING DATA PACKETS

(75) Inventors: Andrew Robert Lehane, Milanthort (GB); Antony Kirkham, Edinburgh (GB)

(73) Assignee: Keysight Technologies, Inc., Santa Rosa, CA (US)

( * ) Notice: Subject to any disclaimer, the term of this patent is extended or adjusted under 35 U.S.C. 154(b) by 665 days.

(21) Appl. No.: 13/600,112

(22) Filed: Aug. 30, 2012

(51) Int. Cl.
H04L 29/06 (2006.01)

(52) U.S. Cl.
CPC .............. *H04L 69/22* (2013.01); *H04L 69/12* (2013.01)

(58) Field of Classification Search
CPC ...... H04L 69/12; H04L 69/22; H04L 63/0245
USPC ....... 370/351, 394, 464, 466, 467, 469, 473, 370/474
See application file for complete search history.

(56) References Cited

U.S. PATENT DOCUMENTS

| | | | |
|---|---|---|---|
| 6,952,425 B1 | 10/2005 | Nelson | |
| 7,107,265 B1 * | 9/2006 | Calvignac | G06F 17/30961 |
| 7,187,694 B1 * | 3/2007 | Liao | 370/474 |
| 7,188,168 B1 | 3/2007 | Liao | |
| 8,769,665 B2 * | 7/2014 | Chan | H04L 63/0209 726/13 |
| 2002/0161969 A1 * | 10/2002 | Nataraj | G06F 17/30982 711/108 |
| 2004/0267732 A1 * | 12/2004 | Luk et al. | 707/3 |
| 2005/0021491 A1 * | 1/2005 | Horgan | 707/1 |
| 2005/0060418 A1 * | 3/2005 | Sorokopud | 709/230 |
| 2005/0238012 A1 * | 10/2005 | Panigrahy | H04L 63/0254 370/389 |
| 2006/0075206 A1 * | 4/2006 | Bouchard et al. | 711/202 |
| 2007/0174237 A1 * | 7/2007 | Wilbrink | G06F 17/30902 |
| 2007/0230482 A1 * | 10/2007 | Shim et al. | 370/400 |

\* cited by examiner

*Primary Examiner* — Un C Cho
*Assistant Examiner* — Fangyan Deng

(57) ABSTRACT

A method for operating a data processing system to decode a data packet and computer readable medium that causes a data processor to perform that method when the media read by the data processing system is disclosed. The method provides a model of the possible data packet formats and an iterative process for moving through the model to decode a data packet. The model includes a plurality of nodes connected by arcs. The program iteratively examines the data packet by proceeding to a next node from a current node. The current node examines a portion of the data packet by matching each of a plurality of candidate matches to that portion of the data packet. The candidate matches include a pattern to be matched against the portion, a priority that determines the order in which the candidates matches are matched, and the identity of the next node.

18 Claims, 3 Drawing Sheets

METHOD FOR DECODING DATA PACKETS

BACKGROUND

There are a number of applications in which a third party needs to monitor traffic on a high bandwidth telecommunications link. In some cases, the monitoring must be done in real time or near real time. For example, tracking mobile devices in an environment that does not require the participation of the mobile operator or the cooperation of the mobile user can enable law enforcement personnel to follow the movements of a person of interest. Such methods rely on decoding a portion of the communication packets exchanged between the cell transmitter and the mobile device to determine which mobile device belongs to the person of interest.

In the case of the mobile tracking system, the problem is simplified by the fact that the protocol being used between the cell and the mobile device is known. However, if there are a number of different protocols that are being used on the communication link, the problem becomes much more challenging. In addition, if the packets must be decoded in real time, the volume of data on many communication links coupled with the lack of prior knowledge of the formats of the packets make conventional decoding techniques economically unattractive.

The typical 3G mobile stack could be in excess of 50 protocols where each protocol's formal specification could be in excess of 30 pages of text. Some are much more. In addition, there might well be multiple concurrent versions of a protocol potentially active and in some cases protocols are deliberately altered; either for convenience so that they interoperate correctly with other protocols, or for simply malicious reasons. In addition, a protocol could be used in undocumented ways and is not necessarily self-describing. To be successfully used to communicate data from a sender to a receiver, those layers that are not needed for transport of the packets can be used in any manner that the sender and receiver agree upon. A third party observing the "conversation" has a limited ability to deal with non-self describing protocols.

Further, there are a number of protocols that are similar to one another, and hence, difficult to distinguish from one another. Finally, in some circumstances the telecommunications link being monitored may exhibit a poor signal-to-noise ratio so that the data on the link has a significant bit error rate. Hence, a system cannot rely on the protocol's own "correct" specification when attempting to identify obfuscated protocols or protocols in which the packets have significant errors within the packets.

Even in cases in which the protocols cannot be completely decoded, it would be advantageous to provide decoding of some of the fields, as these fields may be sufficient for the goals of the monitoring system. For example, in a cellular tracking scheme, only the fields that identify the mobile device are necessary for the tracking operation to be successful.

SUMMARY

The present invention includes a method for operating a data processing system to decode a data packet and computer readable medium that causes a data processor to perform that method when the media is read by the data processing system. The method provides a model of the possible data packet formats and an iterative process for moving through the model to examine a data packet. The model includes a plurality of nodes connected by arcs. The program iteratively examines the data packet by proceeding to a next node from a current node in the model based on an examination of a portion of the data packet. The current node includes code that examines a portion of the data packet by matching each of a plurality of candidate matches in the node to that portion of the data packet. Each of the candidate matches includes a pattern to be matched against the portion, a priority that determines the order in which the candidate matches are matched, and the identity of an arc to arrive at the next node if the pattern matches the portion of the data packet. The current node is initially assigned to a starting node that is common to a plurality of data packet formats. In one aspect of the invention, the program reports data derived from the data packet during the decoding.

In one aspect of the invention, the portion of the data packet examined by the current node is defined by a window that specifies a starting location in the data packet and an ending location in the data packet. If one of the patterns in the current node specifies a field to be matched, and the field is smaller than the window, the pattern is matched against the data packet at a plurality of different starting locations within the window. Each of the starting locations is specified by an offset in the candidate match. When multiple matches are sought for a pattern that is smaller than the window, each successive match is offset into the window by an amount specified by the offset.

In another aspect of the invention, the program moves backward one node if none of the candidate matches in the current node succeeds in finding a match to a pattern in the candidate matches.

In another aspect of the invention, the data processing system stores a history of the nodes visited in the decoding. The history can be stored on a stack in the data processor. The nodes can access the history to determine which candidate searches in the node are to be matched to the portion of the data packet.

In a still further aspect of the invention, the program moves forward one node if all of the candidate matches fail in the current node.

DETAILED DESCRIPTION

Figure 1:
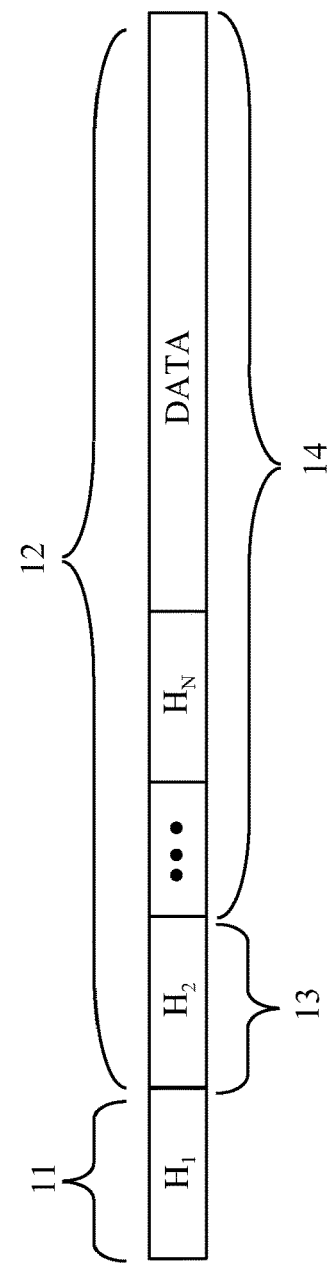
FIG. 1 illustrates a multi-layered data packet.

The manner in which the present invention provides its advantages can be more easily understood with reference to FIG. 1, which illustrates a multi-layered data packet. Data packet 10 can be viewed as having a header record 11 and a payload 12. The header record contains information specifying where the payload is located and information used by the network in moving data packet 10 from one point to another on the network. Payload 12 is itself a layered data packet having a header 13 and a payload 14. Header 13 provides information about the type of data packet, information on how the data packet is laid out including the location of payload 14 with respect to header 13. This layering process continues until the final embedded data packet having header $H_N$ and DATA for its payload is reached.

A third party is typically interested in a sub-set of the information contained in the various headers and/or the final data payload. To extract the data of interest, the third party must know the protocols that are used at each layer in the layered structure. In general, the third party knows the layout of the first layer of the protocol, since that layer is governed by the transmission link. However, the remaining layers each can have a number of different formats.

Figure 2:
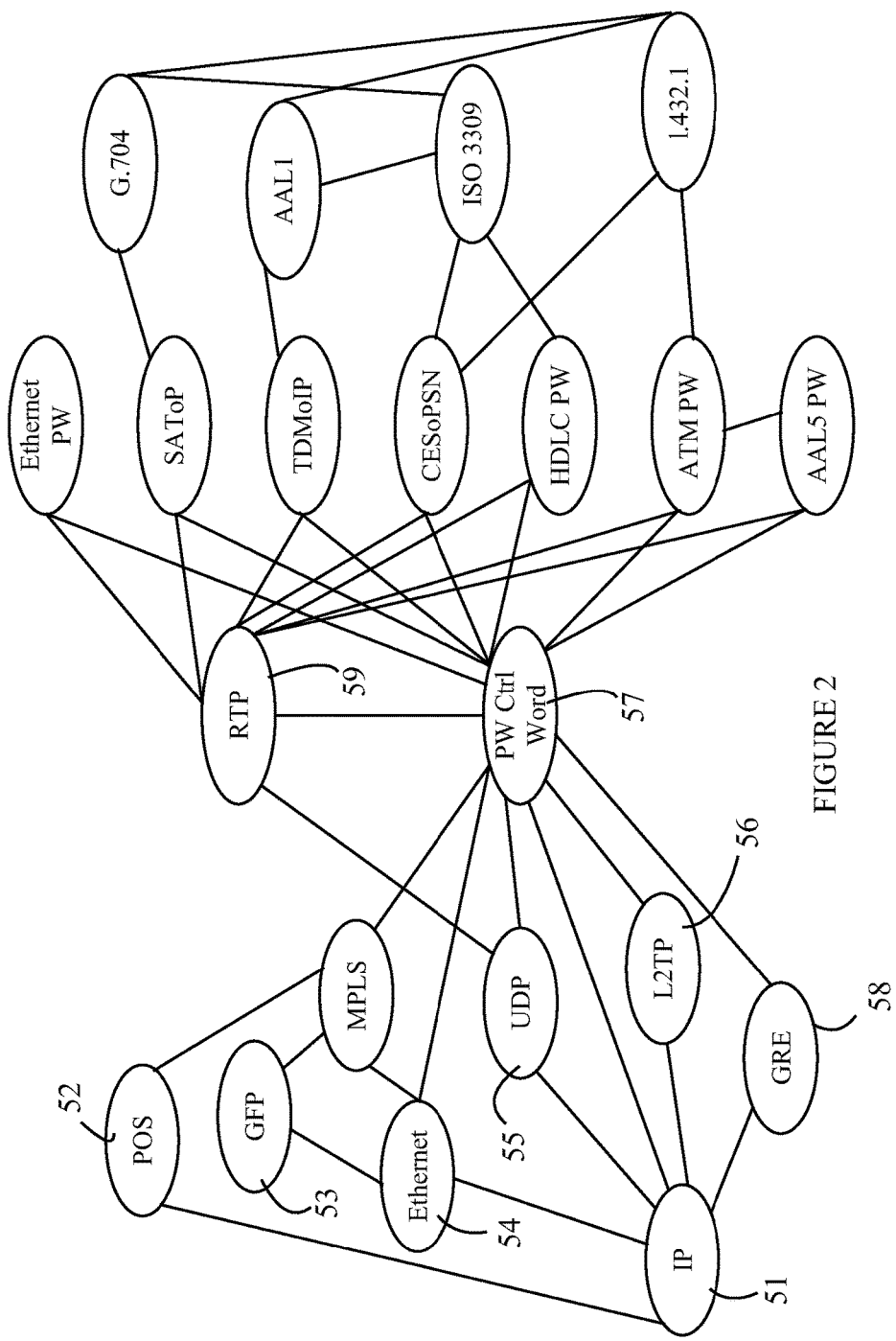
FIG. 2 illustrates such a graph for "pseudowire" packets.

The possible packet structures that are present on a communication link can be represented as a graph having a plurality of nodes that are connected by arcs. Refer now to FIG. 2, which illustrates such a graph for "pseudowire" packets. The various fields in these packets are known to those skilled in the art, and hence, will not be discussed in detail here. For the purpose of the present discussion, the outermost layer is the IP layer 51 and is common to all of the packets. Depending on the value of a field in this packet, the next field to search is identified and will be one of the fields shown at 52-58. The process is continued with a given packet until the end of the packet is reached, i.e., until a node with no outgoing arcs becomes the current node. Ideally, the packet will be decoded until the end of the packet is reached. That is, all of the data will have been decoded. However, as noted above, this is not always possible.

A decoding program according to the present invention utilizes a graph to represent the possible data packets on the network. The model is based upon the structure of the packets and the patterns that are present within the packets. At each node of the graph, the code searches a range of values in the packet to determine if a predetermined pattern is present. If such a pattern is present, the next node to visit is defined provided any other data associated with that pattern is within bounds. Such other data will be referred to as validity data in the following discussion. To simplify the following discussion, the range of values in the packet that are to be tested at any given node will be referred to as a window.

For the purposes of this discussion, the program is defined to have moved forward in the packet if the next node visited corresponds to a window in the packet that is further from the beginning of the packet than the window examined in the current node. The program is defined to move backward in the packet if the next node visited corresponds to a window in the packet that is nearer the beginning of the packet than the window examined in the current node.

Figure 3:
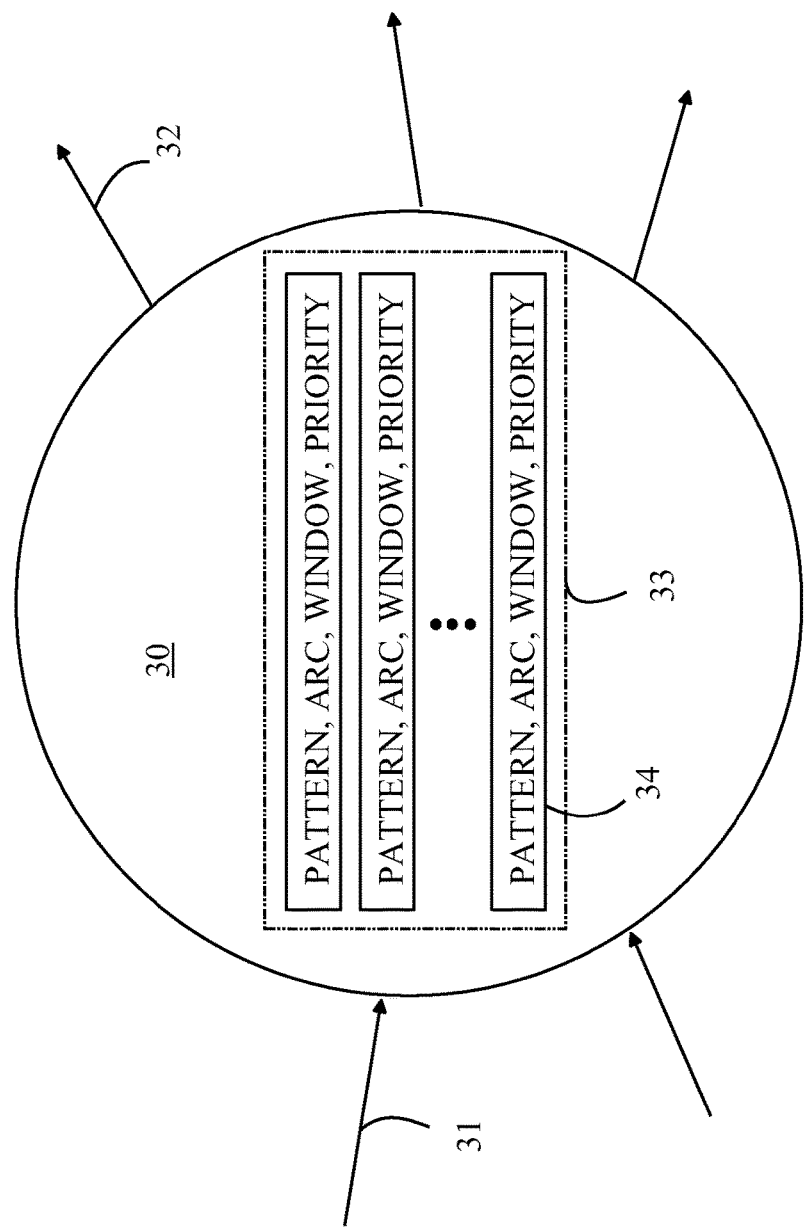
FIG. 3 illustrates a node according to one embodiment of the present invention.

Refer now to FIG. 3, which illustrates a node according to one embodiment of the present invention. Node 30 is reached by one or more entrance arcs such as arc 31. The program exits node 30 via one of the exit arcs such as arc 32. It should be noted that an exit arc could re-enter the same node either directly or via one or more intermediate nodes. Node 30 includes a list 33 of candidate searches of which candidate search 34 is typical.

Each candidate search includes a pattern that is to be matched within the window specified when the program entered node 30. The candidate search may also include code that extracts data from the packet at one or more locations that are related to the candidate search in question. In one aspect of the invention, that data is also tested within the candidate match to ensure that validity data associated with that candidate search is within ranges consistent with candidate search. For example, if the program extracts a pointer to another location in the packet as part of the candidate search, and that pointer indicates a position in the packet that is not consistent with the field in question, the candidate search fails. In general, if the validity data does not meet these tests specified in a candidate search, the candidate search is defined to have failed even if the pattern matches correctly.

Each candidate search also includes an exit arc that identifies the arc to be taken in exiting node 30 if that candidate search succeeds. Each candidate search also includes the definition of a window to be used by the next node if that candidate search succeeds in matching the pattern associated with that candidate search. Finally, each candidate search also includes a priority that determines the order in which the candidate searches are tested.

The exact location of the window specified in each candidate search may not be known until the time at which the search in that candidate node is successful. Similarly, the search window to be used on entry to a node will not necessarily be known until the program actually enters that node, as the previous node determines the size and location of the window used by the next node.

It should be noted that the tree structure of the program could be altered during the execution of the program by having a node insert one or more intermediate nodes into the structure and define a candidate search internally that leads to one of the new nodes. Each node can be defined as an object in an object-oriented runtime system. Hence, a node could include code to instantiate a new instance of a node object and fill in the candidate searches for that node.

As will be explained in more detail below, there are cases in which the two or more candidate searches can have the same search pattern but lead to different exit arcs. This situation can occur if two protocols have the same value in the header at the same location in the packet. In addition, there may be candidates that have the same pattern but different search windows or embedded instructions, as discussed below. In addition, a search pattern may be a "fuzzy" search pattern that can be satisfied by a number of different protocols. Such candidates will be referred to as "weak" candidates in the following discussion. In contrast, if each candidate has a unique search pattern that if satisfied provides a definite match to a protocol, that candidate will be referred to as a "strong" candidate. The manner in which weak candidates are handled will be explained in more detail below. For the purposes of the present discussion, it is sufficient to note that there will be multiple weak candidate search records in which each candidate search has the same pattern but a different exit arc.

For the purposes of this discussion, the window utilized by a node is specified by a starting byte and an ending byte in the packet. In one aspect of the invention, the pattern corresponding to a given candidate is specified by a regular expression. However, any method for specifying a match to a pattern in the window could be utilized. A regular expression consists of constants and operator symbols that denote sets of patterns and operations over these sets, respectively. A pattern specifies a sequence of bytes. Such expressions are well known in the computer arts, and hence, will not be discussed in detail here. The reader is directed to a standard text on automata theory such as Hoperoft, John E.; Motwani, Rajeev; Ullman, Jeffrey D. (2000). *Introduction to Automata Theory, Languages, and Computation* (2nd ed.). Addison-Wesley.

The length of the search pattern can be less than the size of the window. In this case, the program searches for the pattern starting with a specified first byte of the window. If the search fails, the starting location is moved by an amount specified in the candidate search. For example, the search pattern may be restricted to matching on even byte boundaries within the window. In this case, the starting location would be the first even byte of the window and would move by two bytes if the previous search failed. When the starting point for the pattern is such that the pattern cannot be matched without extending outside of the window, the search terminates and the program defines the search in that candidate search as having failed. Accordingly, a search pattern according to the present invention includes a pattern to be searched and an alignment rule that specifies the starting byte in the window and an increment that specifies how far the pattern is to be moved in the window if the last attempt for a match in that window fails.

A node may also include code to report out information when the program leaves that node. The information could include the contents of various fields in the packet, different fields being reported depending on the specific candidate that was matched. In addition, the node could report out the candidate that matched and the details of the match. In one aspect of the present invention, the reported information, or a portion thereof, is also available to the other nodes. The manner in which this information is used by the other nodes will be discussed in more detail below.

The nodes can also include code to determine other information required to follow the arc to the next node. For example, structurally related data, such as lengths, flags, pointers, array sizes and so on that are needed by the program to follow the packet's structure can be included in the node code. For example, the program may arrive at a node, examine a pattern, then read additional data that determines the position of the next pattern. Packet organizations in which the structural information is particular to the packet at hand, and hence, must be read at the time the packet is decoded are common.

In the ideal situation, given a packet, the program will parse the packet in a manner in which the program moves through the packet with each node finding a candidate match corresponding to a strong candidate search. At each node, the window will move to a new location that is deeper in the packet and finally reach the end of the packet. All of the desired data will have then been extracted from the packet.

However, even in a packet in which all of the headers conform to the relevant specifications and the packet has not been corrupted by noise, there can be cases in which the search pattern in a node can be satisfied by any of a plurality of packet formats. That is, the first node that matches the field in question is connected to a plurality of other nodes and there is no search criterion for the present window and first node that distinguishes between possible next nodes. This is the case when the pattern that succeeds in a node is in a weak candidate. It should be noted that, while a single weak match does not provide a high degree of confidence as to the packet format, a series of weak matches coupled by arcs that succeed can provide the desired level of confidence.

In this case, the correct path can be found by trying each of the plurality of next nodes to see if the field tested in that second node matches one of the candidates in that second node. As noted above, when a weak candidate is present in a node there will typically be a plurality of weak candidates. When the first candidate matches the pattern in that candidate, the program will exit by the corresponding arc to a second node. At the second node, there are two possible outcomes. First, the second node could succeed in matching its window to a strong candidate in that node. In this case, the program proceeds as normal.

Second, the second node could fail to find any candidate with a pattern that matches in the window given to the second node. In this case, the program returns to the first node with an indication that the search in the second node failed. The first node then proceeds to search its remaining candidates in the priority order specified in the first node, starting with the highest priority candidate that was not searched in the previous visit to the node. Since there is at least one other weak candidate in the first node, that weak candidate will then cause the program to proceed to the corresponding node. If the program returns to the first node and no candidate searches remain then the packet is corrupted or uses an unknown organization. When a packet fails because no path forward from a particular node can be found, the program will report the failure and the data extracted up to the point of failure. The data provided at such a failure can then be used by the system manager or programmer to define an augmented program that handles this previously unknown packet format.

As noted above, a packet can fail if the packet does not completely conform to the specification for the communication protocol being used for that packet. In addition, the packet could fail because one of the header records has been corrupted by noise. Not all packets are constructed in a manner that adheres to a strict packet definition that conforms to one of a predetermined set of formats. In addition, on noisy communication links such as wireless links, the header data that is used to specify the format can be corrupted.

In these cases, the searches at one or more of the nodes will fail in the sense that no candidate will match at that node. The mismatch may be the result of incorrect data in the current window or in a previous window that caused the program to move to the wrong next node. In some cases, the packet can still be decoded if other fields in the packet are not corrupted. In this case, the corrupted data is not decoded, but the packet can be identified, albeit with a lower level of confidence.

Corrupted data can result in all of the strong candidate searches failing at a particular node. At any given node, there are a finite number of patterns that are possible if the data is not corrupted and the packets conform to the known protocols specified in the program. Most data corruption will be the result of noise causing bits of the packet to be picked or dropped. Hence, patterns corresponding to a predetermined number of bits being dropped or picked for each of the possible patterns for the field of interest could be utilized to form a set of weak candidates to be used in an attempt to improve the level of confidence of the match.

A node will be said to have failed if none of the candidates in the node is satisfied. If a node fails, there are two possibilities. First, the problem could be in the current node. For example, the information in the search window for that node was incorrect due to transmission errors or a nonstandard data format. Second, the problem is in some previously visited node. For example, a previously visited node matched its window to the wrong candidate either because the packet field searched in that node provides an ambiguous answer, i.e., a group of weak candidates, or the portion of the packet in that node was corrupted or used a nonstandard format.

Assume the problem was in a previous node. The mistake could have occurred at the previous node or any node visited prior to that node. This problem is handled by having the program return to the previous node and resume searching the remaining candidates in the order indicated by the priorities as discussed above with respect to the case of a node having a set of weak candidates. The search window is likewise returned to the previous search window used with that candidate. That node then resumes searching with the next candidate in its list of candidates. If the search runs out of candidates in the previous node, then the previous node is defined to have failed, and the program moves back to the next node visited prior to the current node. Sooner or later, the program will return to a node that had a strong candidate that succeeded. That node will either be the end of the search with an indication that the packet could not be reliably decoded past this point or an alternative search strategy must be utilized.

The above strategies assume that the problem that caused the decoding to fail is at a previous node. However, there will be cases in which the problem is due to the corruption of the data in the window at the current node. As noted above, corruption of the data in the current window could have resulted from noise on the communication channel or a user sending packets with a nonstandard format in the inner layers of the packet. If the data that specifies the next window to search for each of the candidate searches in the current window is not corrupted, the program can attempt to move forward in the packet to see if the data in the next window makes sense to the node that handles that window.

In this aspect of the invention, the first node has failed to find a match that moves the program forward in the packet. There are only a finite, and usually small, number of arcs leaving the node. The program can pick these in some order. Referring again to FIG. 2, assume that the program is at node 55 and neither of the candidate searches finds a match. There are only two possible next nodes, i.e., nodes 57 and 59. The program can first try moving to node 57 and see if any of the candidate searches in that node match. If so, then the program proceeds from node 57 to the next node specified by the candidate search in node 57. If no match is found, the program then tries node 59 to see if one of the candidate searches in that node succeeds.

This procedure can be implemented by including a candidate search for each output arc that is identical to the candidate searches that have failed except that the pattern to be matched is "match anything". These searches are assigned priorities below those of the candidate searches that would normally control the arc that is chosen. If one of these searches does not result in a return to the first node indicating failure, then the program will have found the appropriate path. If not, the packet is too corrupted for the search to move forward, and the program moves back to the last good match and reports failure.

The above strategies require the program to keep track of the search history and the results at the various nodes as the program moves forward and, in some cases, backward through the packet. In one aspect of the present invention, the search history is stored on a stack. For the purposes of the present discussion, a stack is defined to be a buffer in which items are stored by adding such items to the said buffer at the location of a pointer and moving a pointer to indicate the location of the beginning of the buffer after the addition, an operation referred to as "pushing" a data item onto the stack. Each time the program leaves a node, the results from that node are pushed onto the stack. Hence, the program can determine whether it has returned to a node after successive failures by examining the stack. While the stack is well suited for the storage of the search history, other buffers for storing the search history could also be utilized.

It should be noted that the method of the present invention could be utilized to decode an entire packet or just selective fields from the packet. As noted above, in many applications, only the contents of specific fields are required for the purposes of the program being implemented using the present invention.

The present invention includes any computer readable storage medium that constitutes patentable subject matter under 35 U.S.C. 101 and that contains instructions that cause a computer or other data processing system to implement a compiler having one or more of the language features discussed above or to execute a runtime program generated from such language features. Such media include non-transitory storage media such as non-volatile computer memories including storage disks and the like.

The present invention can be practiced on any data processor having sufficient computing power to perform the decoding operation in a time consistent with the environment in which the packets are to be decoded. If the packets are to be decoded in real time, a data processing system with significantly more data processing capabilities will, in general, be needed.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a data processing system to decode a data packet, said method comprising:
providing a model of possible data packet formats, said model comprising a plurality of nodes connected by arcs; and
iteratively examining said data packet by proceeding to a next node from a current node in said model based on an examination of a portion of said data packet,
wherein said current node includes code that examines a portion of said data packet by serially matching each of a plurality of candidate matches in said current node to said portion of said data packet, each of said candidate matches comprising a pattern to be matched against said portion, a priority that determines the order in which said candidate matches are matched, and an arc to arrive at said next node if said pattern matches said portion, said matching being made in an order determined by said priority associated with each candidate match, said matching stopping when a match is found.

2. The method of claim 1 wherein said current node includes validity data for one of said candidate matches and wherein said validity data is tested if said pattern associated with that candidate match is matched, said candidate match being defined to have failed if said validity data fails said test.

3. The method of claim 1 wherein said current node is initially assigned to a starting node that is common to a plurality of data packet formats.

4. The method of claim 1 further comprising reporting data derived from said data packet during said examining.

5. The method of claim 1 wherein said portion of said data packet examined by said current node is defined by a window that specifies a starting location in said data packet and an ending location in said data packet.

6. The method of claim 5 wherein said current node was determined by one of said candidate matches in another of said nodes and wherein said window was determined by data extracted from said packet at said one of said candidate matches.

7. The method of claim 5 wherein one of said patterns specifies a field to be matched and said field is smaller than said window, and wherein said pattern is matched against said data packet at a plurality of different starting locations within said window.

8. The method of claim 7, wherein each of said starting locations is specified by an offset in said candidate match that includes said one of said patterns.

9. The method of claim 1 wherein said nodes are visited in a sequence and wherein if none of said candidate matches in said current node succeeds in finding a match to a pattern in said candidate matches, said next node is said one of said nodes that was visited immediately prior to said current node in said sequence, said next node becoming said current node, said method further comprising causing said current node to match said portion of said data packet only to candidate matches that have arcs that have not been previously taken when comparing said portion of said data packet.

10. The method of claim 1 wherein said data processing system stores a history of said nodes visited in said examining and an order in which said nodes were visited, said history excluding nodes that were not visited in said examining.

11. The method of claim 10 wherein one of said nodes uses said history to determine which candidate searches in said node are to be matched to said portion of said data packet.

12. The method of claim 1 wherein said next node is chosen to be a next node defined in one of said failed candidate matches if all of said candidate matches fail in said current node.

13. A non-transitory computer readable storage medium that stores instructions that cause a data processing system to execute a method of examining a data packet, said method comprising:
   providing a model of possible data packet formats, said model comprising a plurality of nodes connected by arcs; and
   iteratively examining said data packet by proceeding to a next node from a current node in said model based on an examination of a portion of said data packet,
   wherein said current node includes code that examines a portion of said data packet by serially matching each of a plurality of candidate matches in said current node to said portion of said data packet, each of said candidate matches comprising a pattern to be matched against said portion, a priority that determines the order in which said candidate matches are matched, and an arc to arrive at said next node if said pattern matches said portion, said matching being made in an order determined by said priority associated with each candidate match, said matching stopping when a match is found.

14. The non-transitory computer readable storage medium of claim 13 wherein said current node includes validity data for one of said candidate matches and wherein said validity data is tested if said pattern associated with that candidate match is matched, said candidate match being defined to have failed if said validity data fails.

15. The non-transitory computer readable storage medium of claim 13 wherein one of said patterns specifies a field to be matched and said field is smaller than said portion of said data packet and wherein said pattern is matched against said data packet at a plurality of different starting locations within said portion of said data packet.

16. The non-transitory computer readable storage medium of claim 13 wherein said nodes are visited in a sequence and wherein if none of said candidate matches in said current node succeeds in finding a match to a pattern in said candidate matches, said next node is said one of said nodes that was visited immediately prior to said current node in said sequence, said next node becoming said current node, said method further comprising causing said current node to match said portion of said data packet only to candidate matches that have arcs that have not been previously taken when comparing said portion of said data packet.

17. The non-transitory computer readable storage medium of claim 13 wherein said data processing system stores a history of said nodes visited in said examining and an order in which said nodes were visited, and wherein one of said nodes uses said history to determine which candidate searches in said node are to be matched to said portion of said data packet, wherein said history excludes nodes that were not visited in said examining.

18. The non-transitory computer readable storage medium of claim 13 wherein said next node is chosen to be a next node defined in one of said failed candidate matches if all of said candidate matches fail in said current node.

\* \* \* \* \*